Feb. 17, 1948.　　　J. J. POWERS　　　2,436,017
DUMP TRAILER
Filed March 1, 1946　　　3 Sheets-Sheet 1

INVENTOR
JOHN J. POWERS
By Alfred W. Petchaft
ATTORNEY

INVENTOR
JOHN J. POWERS
By Alfred W. Pitchap
ATTORNEY

Feb. 17, 1948. J. J. POWERS 2,436,017
DUMP TRAILER.
Filed March 1, 1946 3 Sheets-Sheet 3

INVENTOR
JOHN J. POWERS
BY Alfred W Fitchaft
ATTORNEY

Patented Feb. 17, 1948

2,436,017

UNITED STATES PATENT OFFICE 2,436,017

DUMP TRAILER

John J. Powers, St. Louis, Mo.

Application March 1, 1946, Serial No. 651,058

9 Claims. (Cl. 298—17)

This invention relates in general to a vehicle of the tractor-trailer type and, more particularly, to certain improvements in the construction and arrangement of the trailer as a dump type unit of the vehicle combination.

Accordingly, this invention has for its objects the provision of a trailer unit of the type mentioned which is simple and economically constructed in a manner to improve upon the assembly and compactness of component parts along clean cut lines, which embodies improvements in and relating to the construction and assembly of the chassis and pivotally mounted body component for the purpose of greatly reducing the overall height of the trailer unit, which includes a novel and advantageous arrangement of body elevating means, and which includes further an improved structural assembly for mounting the supporting wheel assembly and movable body.

With the above and other objects in view, the invention resides in the novel features of form, construction and arrangement of parts and component portions hereafter described and pointed out.

In the accompanying drawings (3 sheets)—

Figure 1:
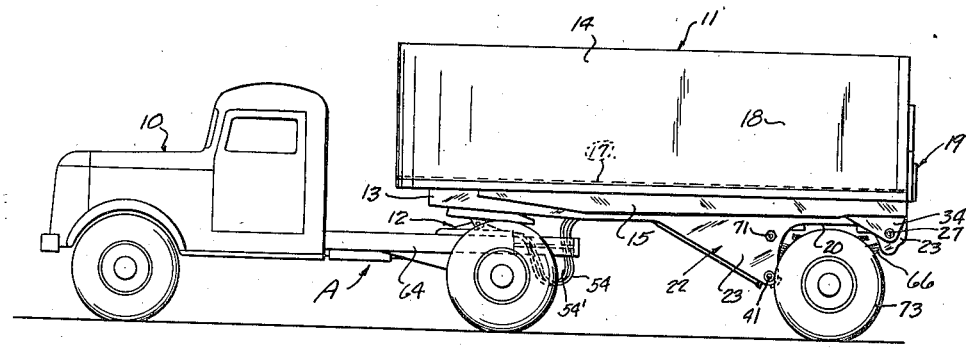
Figure 1 is a general assembly view in side elevation of a tractor-trailer vehicle forming the basis of the invention.

Referring now in more detail and by reference characters to the drawings, which illustrate a preferred embodiment of the present invention, A designates generally a truck-trailer construction comprising a prime mover or tractor 10 and a trailer unit 11 swively and detachably connected to the tractor 10 by means of a so-called fifth wheel assembly of any well known type, the latter being only generally indicated at 12.

In accordance with the foregoing objects, the trailer unit 11 is, by preference, arranged with chassis frame members 13 formed of suitable structural shapes and a load-carrying body portion 14 disposed to rest upon the members 13 when in normal load-carrying position. The body 14 includes longitudinally disposed frame or structural members 15, arranged generally parallel to and astraddle the chassis members 13, and a plurality of cross tie members 16 upon which body flooring 17 is placed and to which side elements or panels 18 can be secured for retaining the material or other objects within the body 14. In the present example, the body 14 is adapted to contain and transport material of the character of coal, gravel, sand, and the like which can be handled in mass quantity. To this end, the body is provided with a material discharge opening or door assembly 19 in the rearward end thereof for the purpose of facilitating its removal from the body upon elevation of the latter as indicated by dotted lines in Figure 2. However, it should be understood that the present invention is not limited to the specific disclosure herein made, but that such embodiment is given by way of example only for purposes of present description.

Figure 2:
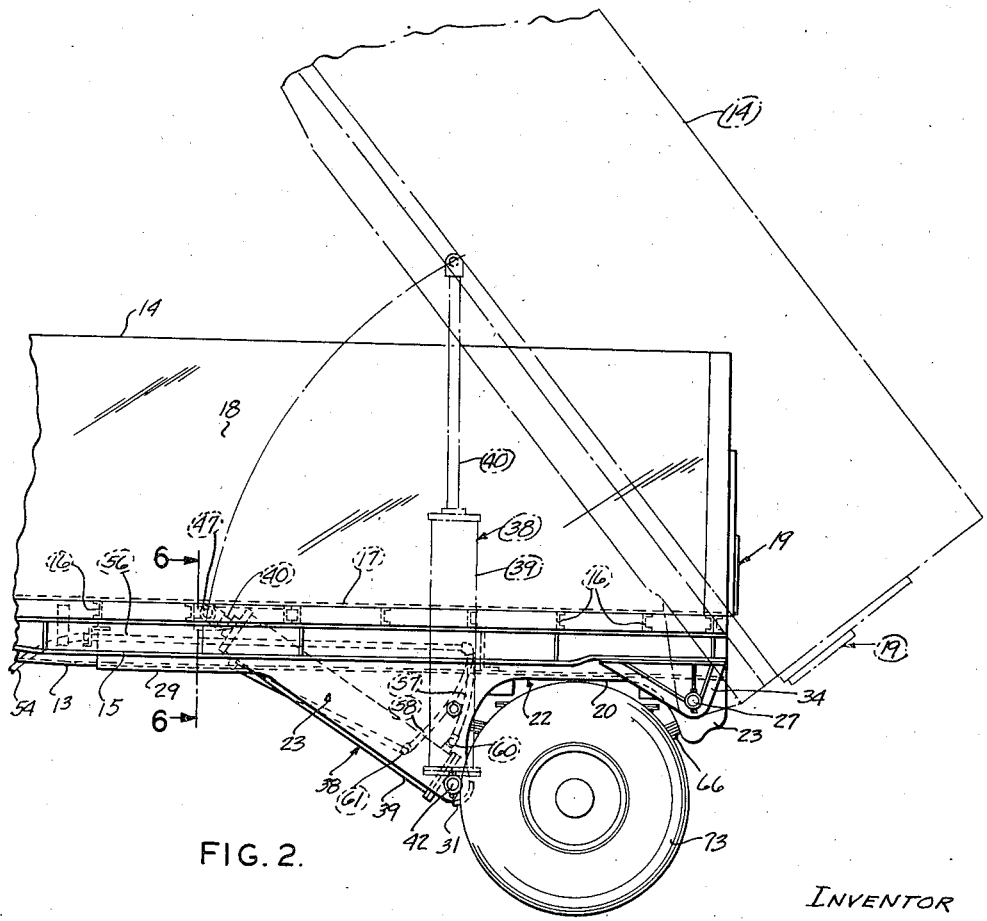
Figure 2 is an enlarged and fragmentary elevational view of the trailer unit in which certain structural features and operating parts are shown, the relation of the dump body and elevating means in load-discharging position being shown in dotted lines.
Figure 3:
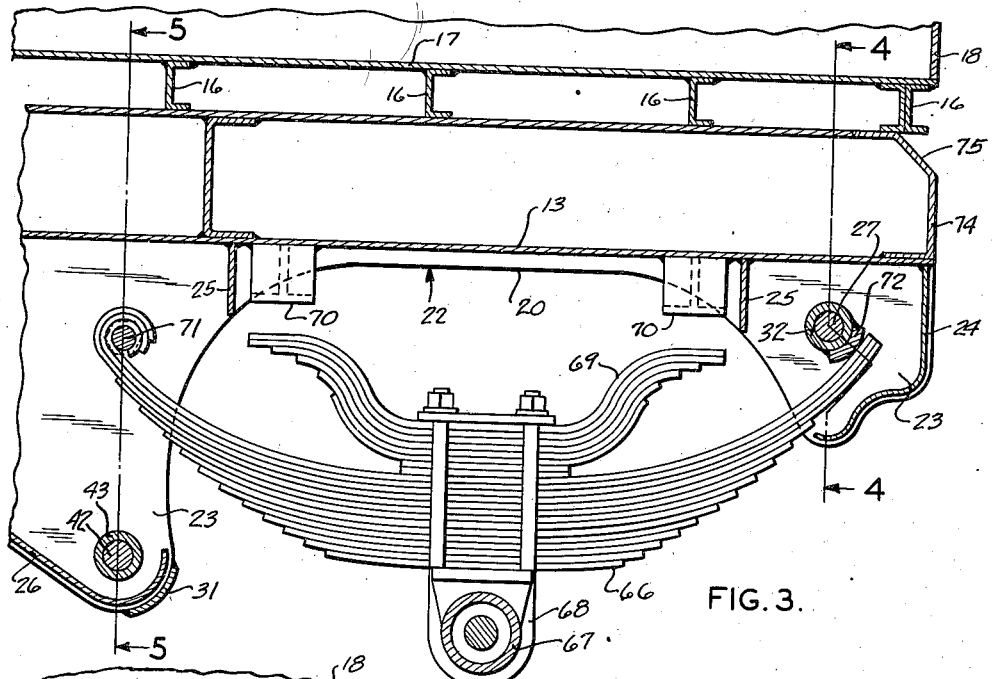
Figure 3 is also an enlarged and fragmentary sectional elevational view of the chassis and suspension assembly for the wheels.
Figure 4:
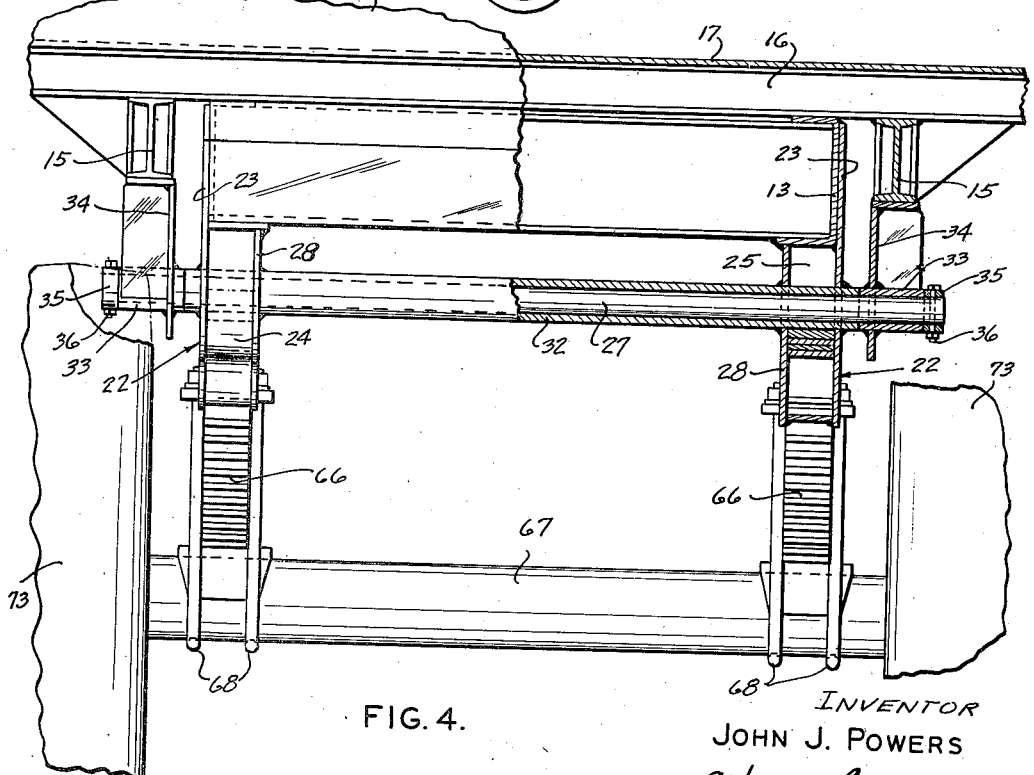
Figure 4 is a greatly enlarged, partial sectional end view of the trailer unit along line 4—4 of Figure 3.
Figure 5:
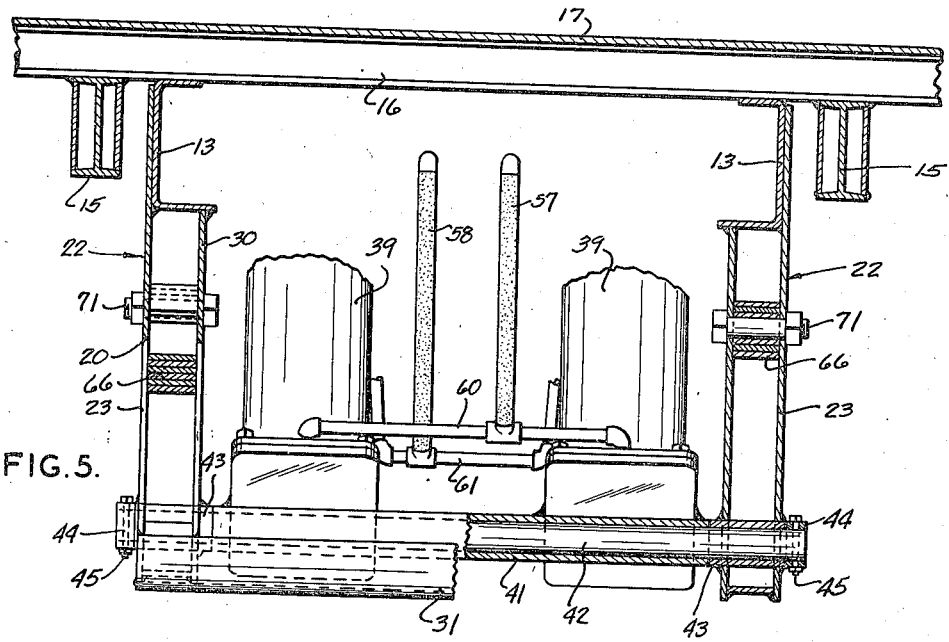
Figure 5 is a view similar to the one preceding but showing further details of construction and assembly as the same appears along line 5—5 in Figure 3.

In the usual arrangement and assembly of trailer chassis and dump body, the body members 15 generally are adapted to rest on top of the chassis members 13, so that the body pivot means can be mounted in or on top of the members 13. This has the effect of elevating the body an undue amount, resulting in greater body height and requiring increased clearance space or head room for passage of the body beneath overhead road obstacles. In the present case, the trailer is constructed in a manner which permits considerable reduction in overall height as by arranging the body members 15 astraddle the chassis frame 13. This arrangement is further facilitated by the provision of means permitting the locating of the body pivot assembly below the chassis. As indicated in Figures 1 through 5, the chassis frame 13 carries a pair of depending side frames 22 which are welded assemblies, each comprising an outer plate 23 suitably stiffened and reinforced by a rear element 24, intermediate webs 25 and a forward element 26. These side frames 22 are each secured to one of the longitudinal chassis members 13, as by welding, and extend forwardly from the rear ends thereof. As indicated in Figures 2, 3, and 4, each of the side plates 23 is cut away at 20 intermediate its forward and rearward ends to accommodate the assembly of the resilient wheel suspension, as will later appear, while the rearward end zone thereof extends downwardly to provide, at the rearward end of the chassis, a semi-enclosed housing for the support of body pivot element 27 in conjunction with stiffening elements 24 and 25, and an inner closure plate 28 (Figure 4) welded to the latter elements. The forward end of side plate 23 also depends but to a greater extent and is further provided with an upwardly inclined forward edge which terminates in a forwardly projecting tongue 29 welded to the side face of the chassis frame member 13 (Figure 2). In this manner a second partially enclosed housing is provided by the plate 23, stiffening members 25 and 26, and an inner reinforcing plate 30 (Figure 5). In addition to the inner plates 30, each of these forward depending housings is further united to constitute a rigid structure by means of a cross element 31 which is welded to the side plates 23, as indicated in Figure 3.

In the present example, the body pivot element 27 (Figure 4) is journalled in a sleeve 32 which extends from side to side of the trailer chassis through the several housing plates 23 and 28 and to which the same is welded. The element 27 extends outwardly of each end of the sleeve 32 and receives a pivot journal or sleeve 33, which is welded to a depending bracket 34 carried on the lower flange face of the body frame members 15. A retaining collar 35 and locking element 36 positioned at each end of the pivot element 27 holds the latter against lateral displacement.

Figure 6:
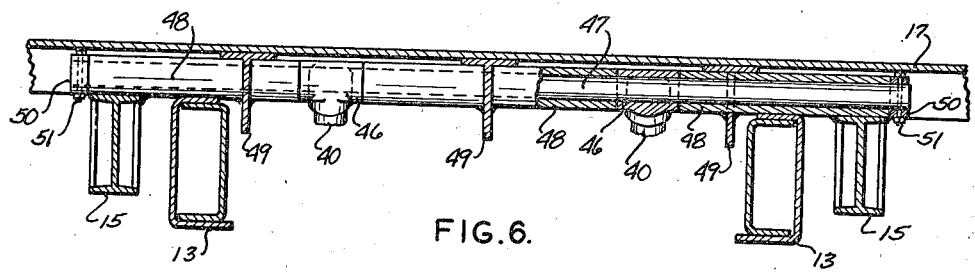
Figure 6 is an enlarged, fragmentary sectional detail of still another portion of the trailer structure along line 6—6 in Figure 2.

Referring now to Figures 2, 5, and 6, it can be seen that the trailer body 14 is pivotally movable about element 27 under the action of fluid operated means 38, which comprises a pair of cylinders 39 and piston rods 40. In the presently preferred arrangement, the means 38, or what will be referred to as lifting jacks, are each suitably secured at their lower ends to a sleeve 41, which is journalled upon a pivot-forming shaft 42 in turn bearinged in end sleeves 43 carried by the side walls 23 and 30 of the forward housing portion of side frame structures 22. The shaft 42 is secured against lateral movement by end collars 44 and locking elements 45. Each of the lifting jacks 38 is normally directed upwardly and forwardly from the common pivot sleeve 41, so that the piston rods 40 thereof are operatively connected to the under side of the body 14 ahead of the cylinder pivot sleeve 41. In Figure 6, it is seen that each piston rod is operatively pivotally connected through sleeved elements 46 to a common shaft 47 extending across the body 14 and mounted in an elongated bearing sleeve 48, which, in turn, is secured to the several longitudinal load-carrying intermediate beams 49 of the body 14 as well as to the members 15 thereof. Lateral displacement of shaft 47 is prevented by suitable end collars 50 and locking elements 51.

The system for supplying fluid under pressure to each of the lifting jacks 38 includes (Figures 1, 2, and 5) a flexible fluid supply line 54 and a return line 54' each of which is connected with suitable means (not shown) for the supply of fluid under pressure, the latter means being located on the tractor unit 10, as is the usual arrangement. A third hydraulic hose line 55 is provided for connection to conventional hydraulic brakes (not shown) which are associated in the usual manner with the trailer wheels. The connection of the fluid lines with the trailer is had through flexible hose sections in order to provide sufficient slack to care for relative movement of tractor and trailer units during maneuvering of the same. Each of these flexible hose sections connects with fixed conduits carried on the trailer chassis, one such conduit being shown at 56 in Figure 2. Each of said conduits extends rearwardly for connection with the lifting jacks through other flexible hose sections 57 and 58, the hose section 57 being the fluid supply line and section 58 the return line. The fluid supply is connected to each cylinder 39 through a common header pipe 60, and a common fluid return header 61 connects each cylinder with the return line 58. Control means (not shown) for regulating the supply of fluid to the cylinders 39, when it is desired to elevate the body 14 or to permit return to normal position, is located in the tractor conveniently at hand for the operator.

Figure 7:
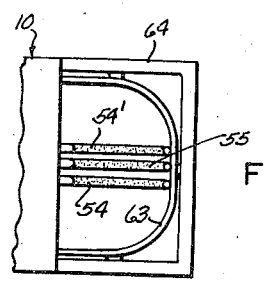
Figure 7 is a fragmentary plan view of the tractor chassis illustrating additional details thereof.

As indicated in Figure 7, the flexible hose sections 54 and 54' connected at the tractor and in the zone of the fifth wheel assembly 12 are suitably looped or slackened to give the required freedom of movement between tractor and trailer. As a precautionary measure and to prevent damage or entanglement of the hose sections 54 and 54' with the vehicle, a guard rail 63 has been mounted on the tractor chassis 64 within the confines of the frame members thereof.

Returning now to Figures 3, 4, and 5, it can be seen that the trailer chassis is resiliently supported on a pair of spring assemblies 66 of the resilient multi-leaf type. Each such spring is secured to the wheel axle housing 67 by suitable elements 68. In addition to main springs 66, small buffer springs 69 are employed in cooperation with helper pads 70 fixed on the chassis 13, all as clearly shown in Figure 3. It is of particular importance to note the arrangement of spring suspension which involves a floating-type connection. It is preferred to attach the forward end of each spring 66 to the adjacent side frame 23 by means of a bolt or hanger 71, the latter being carried by frame 23 and plate 30 (Figure 5) so as to retain the spring end within the housing formed thereby. The rearward end of the springs is free-floating or free to slide or move relative to a bearing pad 72 carried by the sleeve 32. In this arrangement, the inner spring-leaf bears against the cylindrical face of the pad 72 when the trailer is riding on the rear wheel assembly 73.

The operation of the trailer body in pivoting about the shaft 27 to discharge its load through the door assembly 19 is effected by application of fluid under pressure to the cylinders 39 through lines 54, 57 and header 60. It will be seen in Figure 2 that the lifting jacks 38 operate, when raising the body 14, from a location rearwardly and angularly below their point of body attachment at shaft 47, thereby facilitating the load-discharging operation. It is advantageous to arrange the jacks 38 in this manner as the same are positioned to be free of any interference with the fifth wheel assembly 12, and further are protected against damage due to the location between the side frames 22 for carriage of the rear wheel assemblies 73. The area under the trailer chassis and rearwardly of the tractor is left free and clear of normal operating mechanism, and as a result permits quick and easy access to the fluid lines and for general service attention to all parts of the trailer and tractor. While stop means (not shown) may be utilized to determine the safe limit of swinging movement of the jacks 38, it is readily apparent that the jacks will not swing into a position of instability when moving the body to such angle as will accomplish complete load discharge, since the maximum stroke of the piston rods 40 is preferably attained at or close to the vertical position thereof and, hence, prior to displacement of the center of gravity of body 14 rearwardly and outside of the body pivot means 27 (see Figure 2). It is also apparent that the lifting jacks 38 are attached to structure well adapted to assume the reactionary thrust thereof whereas in conventional arrangements the jacks are positioned to push rearwardly on the body and special structure must, therefore, be built into the forward part of the chassis to take thrust as the body is moved or elevated.

This invention also provides an improved trailer chassis construction in that the side frames 22 not only serve as means for wheel suspension and lifting jack supports, but also permit the body pivot 27 to be brought down below the chassis so that considerable reduction in height can be realized. Moreover, the combination of side frames 22 and inner stiffening plates 28 and 30 provide semi-enclosed housings for the spring bearing points, as at 71 and 72. The overall chassis structure exhibits clean lines having features of compactness and durability. As indicated in Figure 3, the rearmost chassis cross brace 74 is formed with a beveled face 75 to provide adequate clearance for the body during pivoting movement and to close the end of the frame against the collection of dirt and foreign matter.

It should be understood that changes and modifications in the form, construction, arrangement, and combination of the several parts of the dump trailer may be made and substituted for those herein shown and described without departing from the nature and principle of my invention.

Having thus described my invention, what I claim and desire to secure by Letters Patent is:

1. In a vehicle of the character described, a dump trailer unit which comprises a main chassis including longitudinally extending load-carrying members, depending frame structures secured to each of said load-carrying members, pivot-forming means carried by and extending between said depending frame structures, a load-carrying body mounted on said load-carrying members of the main chassis and including longitudinal members arranged in laterally spaced relation to straddle said load-carrying members, and means secured to each of said body members for connection with said pivot-forming means to permit pivotal movement of said body into load dumping position.

2. In a vehicle of the character described, a dump trailer unit which comprises a chassis having longitudinally extending and laterally spaced structural beam members, depending frame structures secured to each of said beam members adjacent the rearward ends thereof, pivot means carried by and extending between said depending frame structures, a load-carrying body mounted on said chassis and including longitudinal members arranged in laterally spaced relation to straddle said chassis beam members, and bracket means secured to each of said body members for connection with said pivot means to permit pivotal movement of said body into dumping position, said bracket means extending below said body members to straddle said depending frame structures.

3. In a vehicle of the tractor and detachably connected trailer type, the improvement in the trailer thereof which comprises a chassis having laterally spaced and longitudinally extending members, a frame structure carried by each of said chassis members, each of said frame structures being constituted by longitudinally spaced depending portions, a first pivot-forming means carried by and extending between certain of said depending portions, a second pivot-forming means carried by and extending between other of said depending portions, a body mounted on said chassis normally in load-carrying position and having a connection with said first pivot means for permitting movement of said body into load discharging position, and fluid pressure operated means connected to said second pivot means and to said body for moving the latter into its load discharging position.

4. In a vehicle of the tractor and detachably connected trailer type, the improvement in the trailer thereof which comprises a chassis having spaced and longitudinally extending members, a depending frame structure carried by each of said chassis members, spaced pivot-forming means extending between and carried by said frame structures, a body mounted on said chassis and connected with one of said pivot-forming means for pivotal movement between load-carrying and load-discharging positions, and body moving means connected to another of said pivot-forming means and to said body at a point above and forwardly of said other pivot means whereby, as said body is moved into load-discharging position, said moving means swings substantially into a vertical position.

5. In a dump trailer of the character described, spaced chassis members extending longitudinally of the trailer, a body including longitudinally extending elements arranged in spaced relation to straddle said chassis members, means on said chassis members providing a pivot located therebelow and adjacent the rearward ends thereof, means on said body elements for connection with said pivot means to permit movement of said body between load-carrying and load-discharging positions, a body moving jack of fluid pressure operated type carried by said chassis members at a zone below and forwardly of said pivot means, and a pivot assembly on said body located forwardly of the zone of connection between said moving jack and chassis members, said moving jack being connected to said pivot assembly and exerting a thrust thereon for moving said body between said positions.

6. In a dump trailer of the character described, including a chassis having laterally spaced side frame structures defined by longitudinally spaced depending portions, pivot means carried by and extending between certain of said depending portions, a trailer dump body mounted on said chassis and pivotally connected with said pivot means, other pivot means carried by and extending between other of said depending portions at a zone forwardly of said first mentioned pivot means, and a body lifting jack mounted on said other pivot means and having a connection with said trailer dump body at a point thereon such that when said body is pivoted into a load dumping position, the forward end of said lifting jack will swing upwardly and rearwardly into a substantially vertical position.

7. In a vehicle of the character described, a dump trailer unit which comprises a main chassis including longitudinally extending load-carrying members, depending frames secured to each of said load-carrying members, a sleeve carried by and extending transversely between said depending frame structures, a shaft-like body pivot-element carried by, and projecting outwardly at its end from said sleeve, a load-carrying body mounted on said load-carrying members of the main chassis and including longitudinal body members arranged in laterally spaced relation to straddle said load-carrying members, a bracket secured to each of said longitudinal body members and a journal carried by each bracket, said journals being operatively mounted on the projecting ends respectively of the pivot-element to permit pivotal movement of said body into load dumping position.

8. In a vehicle of the character described, a dump trailer unit which comprises a main chassis including longitudinally extending load-carrying members, depending frames secured to each of said load-carrying members, a sleeve carried by and extending transversely between said depending frame structures, a shaft-like body pivot-element carried by, and projecting outwardly at its end from said sleeve, a load-carrying body mounted on said load-carrying members of the main chassis and including longitudinal body members arranged in laterally spaced relation to straddle said load-carrying members, a bracket secured to each of said body members and extending downwardly therefrom into overlapping relationship with respect to the depending frames, and a journal carried by each bracket, said journals being operatively mounted on the projecting ends respectively of the pivot-element.

9. In a vehicle of the character described, a dump trailer unit which comprises a main chassis including longitudinally extending load-carrying members, depending frame structures secured to each of said load-carrying members, a shaft-like body pivot-element extending transversely between and projecting outwardly at its end from said frame structures, a load-carrying body mounted on said load-carrying members of the main chassis and including longitudinal members arranged in laterally spaced relation to carry said load-carrying members, a bracket secured to each of said longitudinal body members, and a journal carried by each bracket, said journals being operatively mounted on the projecting ends respectively of the pivot-element.

JOHN J. POWERS.

REFERENCES CITED

The following references are of record in the file of this patent:

UNITED STATES PATENTS

| Number | Name | Date |
| --- | --- | --- |
| 1,725,460 | Weber et al. | Sept. 17, 1929 |
| 1,952,718 | Lee | Mar. 27, 1934 |
| 2,027,098 | Helms | Jan. 7, 1936 |
| 2,144,828 | Biszantz et al. | Jan. 24, 1939 |
| 2,234,135 | Barrett | Mar. 4, 1941 |